Jan. 31, 1961 M. L. FREEMAN 2,969,811
VALVES
Filed March 14, 1955 3 Sheets-Sheet 1

INVENTOR
Mathew L. Freeman

BY *Hastings Ashley*

ATTORNEY

INVENTOR
Mathew L. Freeman

INVENTOR
Mathew L. Freeman

United States Patent Office 2,969,811
Patented Jan. 31, 1961

2,969,811
VALVES
Mathew L. Freeman, Dallas, Tex.
(114 S. Jackson St., Crown Point, Ind.)
Filed Mar. 14, 1955, Ser. No. 494,180
15 Claims. (Cl. 137—627.5)

This invention relates to valves and more particularly to a fail-safe three way valve.

An object of this invention is to provide a new and improved three way valve having a fail safe action.

Another object is to provide a new and improved three way valve having a pair of separately movable valve plugs for selectively directing flow of fluid through either of two outlets of the valve, and wherein the valve plugs each seat independently of the other to provide for a sure tight seat to cut off flow therepast.

Still another object of the invention is to provide a three way valve having a construction which shields the operative elements of the valve from the fluid passing through the valve whereby such operative elements are protected from the corrosive action of the fluids and from the erosive action of sand or other particles carried by the fluid.

A further object of the invention is to provide a three way valve having a single operator for selectively seating each or both of the two valve plugs, movement of the operator in one direction unseating one of the valve plugs and the movement in the opposite direction unseating the other valve plug.

An important object of the invention is to provide a valve of the character described having the two plug members which are independently separately operable and which are so arranged that the valves are each in tightly seated position closing off all flow through the valve when shifting flow from one outlet to the other and vice versa.

A still further object of this invention is to provide a new and improved valve, of the type described, having two separated movable operators, each operator controlling a valve plug whereby both valve plugs may be unseated at the same time.

Another object of the invention is to provide a three way valve, of the type described, of simple economical construction which may be easily assembled and disassembled.

Additional objects and advantages of the invention will be readily apparent from the reading of the following description of devices constructed in accordance with the invention, and reference to the accompanying drawings thereof, wherein.

Figures 1, 2:
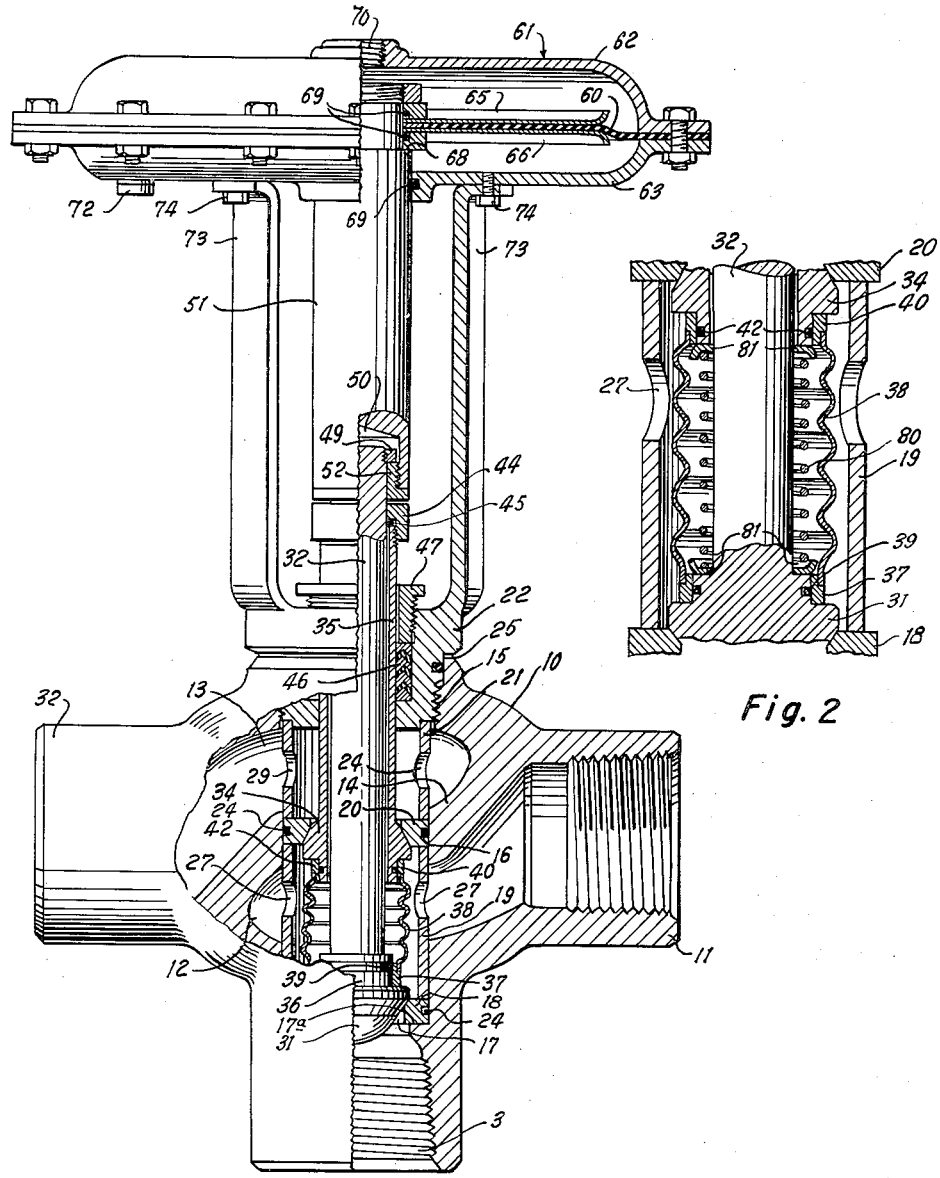
Figure 1 is a view partly in elevation and partly in section of a three way valve having two separately acting valve plugs connected by a stem and having a protecting bellows positioned in a valve body having a single inlet and two outlets, the valve plugs being separately selectively movable by a diaphragm actuated operator to permit flow of fluids through either of the outlets.
Figure 2 is an enlarged fragmentary vertical sectional view of a modified form of the valve plug assembly having a plug biasing spring positioned within the bellows.

Referring now particularly to Figure 1 of the drawings, the valve body 10 is provided with an inlet 11, opening into a central channel divided into two compartments 12 and 13 by a partition 14.

The valve body 10 is provided with aligned circular apertures 15, 16 and 17, in its upper wall, in the partition 14 and in its lower wall, respectively. A lower valve seat 18 is disposed on an annular shoulder 17a at the lower end of the bore 17 of the body. A lower spacer sleeve 19 rests on the lower valve seat and extends upwardly into the circular aperture 16 of the partition 14 and supports an upper valve seat 20 therein. An upper spacer sleeve 21 is supported by the upper valve seat 20 and extends upwardly into the upper circular aperture 15, which is internally threaded and receives a valve bonnet 22 which is threaded thereinto and abuts the upper end of the upper spacer sleeve 21 to hold the valve seats and spacer sleeves firmly in position in the valve body. The valve seats are provided with O-rings 24 which seal between the valve body and the outer surfaces of the valve seats to prevent passage of fluid therebetween, and the valve bonnet 22 is provided with a similar O-ring 25 which performs the same function.

The upper and lower spacer sleeves are provided with lateral apertures 29 and 27, respectively, so that fluid flowing through the inlet 11 into the compartment 12 may flow into the interior of the lower spacer sleeve 19 through the lateral apertures 27 and thence downwardly through the lower valve seat and outwardly through the outlet 30 on the lower side of the valve body. A lower valve plug 31, which normally seats on the lower valve seat and holds it closed may be raised by its stem 32 to open the passage through the lower seat. The fluid may also flow upwardly from the interior of the lower spacer sleeve 19 through the upper valve seat 20 into the interior of the upper spacer sleeve 21, through its lateral apertures 29 into the compartment 13 and out through the other outlet 32 on the side of the valve body. An upper valve plug 34, which normally seats on the under side of the upper valve seat 20 and holds it closed, may be lowered by its cylindrical stem 35 to open the passage through the upper seat.

The lower valve plug 31 may be formed integral with its stem 32, and the stem may be provided with an enlargement 36 adjacent the valve plug 31 about which the lower retainer ring 37 at the lower end of a resilient bellows 38 engages. An O-ring 39 disposed in an annular recess in the enlargement 36 seals between the retainer ring 37 and the stem 32.

The upper retainer ring 40 of the bellows engages around the depending reduced lower end of the upper valve plug, and an external annular recess formed in said depending portion of the valve plug holds an O-ring 42 which seals between the upper retainer ring and the upper valve plug. The retainer rings 37 and 40 of the bellows are welded or otherwise secured in fluid tight relation to the lower and upper ends of the bellows so that the seals provided by the O-rings 39 and 42 prevent any fluid passing through the valve from entering into the bellows. Likewise, fluid in the bore of the bellows is prevented from escaping therefrom by such seals.

The upper valve plug and its stem are cylindrical in form and are slidable on the stem of the lower valve plug so that longitudinal movement of the upper and lower valve plugs with respect to each other can take place.

The upper end of the cylindrical stem 35 is exteriorly threaded and provided with a cap 44 at its upper end. An O-ring 45 in the cap seals between the stem 32 of the lower valve plug and the cylindrical stem. Similarly the chevron packing 46 disposed in an enlarged recess in the bore of the valve bonnet is compressed by the packing nut 47 to seal between the valve bonnet and the exterior of the cylindrical stem 35 of the lower plug. It will thus be seen that the fluids passing through the valve body cannot escape between the stems 32 and 35 or between the cylindrical stem 35 and the valve bonnet.

The upper end of the stem 32 extends upwardly above the upper end of the cylindrical stem 35 and is provided with a stop ring 49 threaded thereon which is disposed in a bore 50 in the lower end of an operator 51. A retainer bushing or ring 52 threaded into the bore 50 is adapted to engage the stop ring 49 when the operator 51 is moved upwardly, and this causes the stem 32 to move upwardly against the resistance of the bellows 38 and lift the lower valve plug 31 from its valve seat 18 and thus permits fluid from the inlet 11 to flow downwardly through said seat and thence out the outlet 30.

When the operator 51 is moved downwardly, the retainer ring 52 engages the cap 44 of the upper end of the cylindrical stem and causes the cylindrical stem to move downwardly against the resistance of the resilient bellows and lower the upper valve plug from its valve seat 20 and thus permit fluid from the inlet 11 to flow upwardly through said seat and out the outlet 32. It will be noted that the bore 50 is of sufficient length that a certain degree of movement between the operator 51 and the inner stem 32 can take place so that the cylindrical stem can be moved downwardly a sufficient distance to fully unseat the upper valve plug before the upper end of the stem 32 contacts the operator and prevent further downward movement thereof.

The resilient bellows 38 exerts a yielding biasing force which tends to move the valve plugs apart and into engagement with their respective valve seats, so that the force exerted by the spring action of the bellows tends to close the valve and prevent any flow of fluid from the inlet 11 through the valve body. In addition, the pressure of the fluid entering into the valve body through the inlet 11 also exerts force upon the valve plugs which tends to move them into closer engagement with their valve seats.

It will be seen that a three way valve has been illustrated and described which is provided with a pair of valve plugs normally resiliently biased away from each other into seating engagement with their respective valve seats so that no fluid may normally flow through the valve. It will also be seen that movement of the operator 51 in an upward direction will lift the lower valve plug 31 off its valve seat and permit fluid to flow from the inlet 11 to the outlet 30; while movement of the operator 51 in a downward direction will move the upper valve plug 34 downwardly from its valve seat and permit fluid to flow from the inlet 11 to the outlet 32.

It will also be seen that the resilient bellows 38 and the various O-rings not only prevent escape of fluid between the two operating stems, but also prevent entrance of the fluid between the two stems and thus prevent corrosion and erosion of the adjacent surfaces of the stems which could cause jamming or other malfunctioning of the valve.

It will be obvious that the three way valve is a fail-safe valve, and the spring action of the resilient bellows tends to hold the valve plugs in closed position preventing flow of fluid through the valve, and that the pressure of the fluid entering through the inlet 11 also tends to cause the valve plugs to stay in closed position.

Reverse flow of fluid from the outlets 30 and 32 toward the inlet 11 is also resisted by the force of the resilient bellows. In addition, the area of the valve plugs exposed to such reverse pressure may be made very small as compared to the area of the valve plugs exposed to the pressure of the fluid flowing into the valve body through the inlet 11 so that only extreme reverse pressures which ordinarily are not encountered could result in undesired opening movement of the valve plugs.

The movement of the operator 51 can be controlled in any desired manner. For example, its upper end may be connected to a diaphragm 60 disposed in a housing 61 composed of upper and lower dished members 62 and 63, between which the diaphragm is confined. The operator may be connected to the diaphragm 60 by means of a nut 64 threaded on its upper end which holds the load bearing plates 65 and 66 disposed on opposite sides of the diaphragm 60 firmly secured to the operator by the central bosses of the load bearing plates clamped between the nut and an annular shoulder 68 near the upper end of the operator. O-rings 69 mounted in suitable recesses in the bosses of the plates and between the plates and the operator to prevent fluid leakage between opposite sides of the diaphragm.

Fluid may be introduced into the upper part of the housing through the inlet 70 to act on the diaphragm and cause the operator 51 to be moved downwardly, while fluid introduced into the lower part of the boring through the inlet 72 will act on the diaphragm to cause the operator to be moved upwardly. Fluids under different pressures may be introduced simultaneously through the inlets 70 and 72 so that the movement of the operator 51 will be caused by the differential of such pressures.

The housing 61 may be mounted on the valve bonnet 22 by means of upwardly extending arms 73 on the valve bonnet and suitable screws 74.

In Figure 2 is illustrated a slightly modified form of the valve of Figure 1, wherein a spring 80 is disposed about the inner stem 32 between the lower and upper valve plugs to reinforce the action of the bellows 38 in biasing the valve plugs in opposite directions toward closed positions on their valve seats. The addition of such reinforcing spring may be desirable in installations where severe reverse pressures may occur. Dished washers 81 may be disposed between the valve plugs and the ends of the reinforcing spring to hold it properly spaced with respect to the stem 32. Likewise, a suitable fluid or liquid may be confined within the bellows to prevent collapsing thereof, and to limit movement of the valve plugs.

Figures 3, 4:
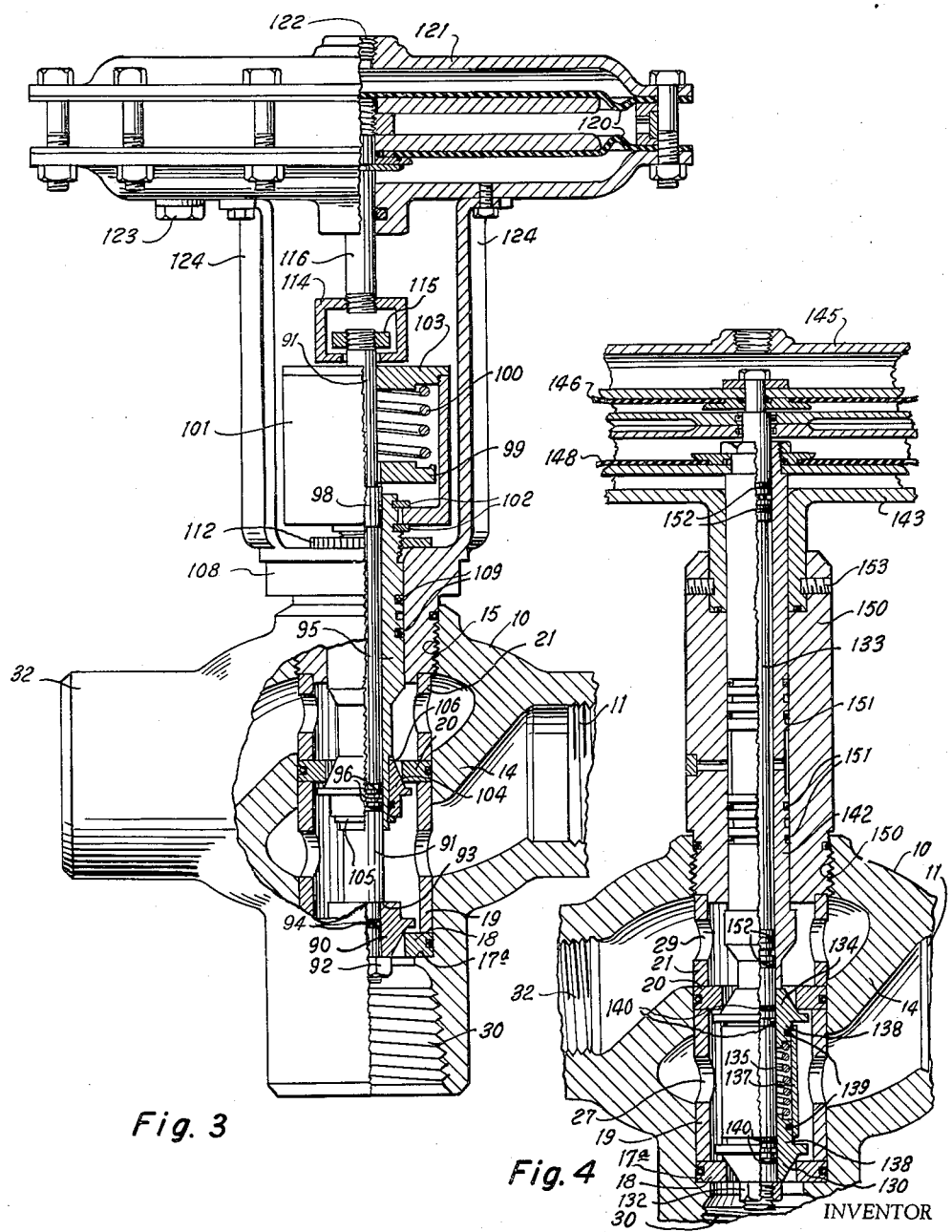
Figure 3 is a view partly in elevation and partly in section of a modified form of the three way valve having the valve plug biasing spring positioned outside the valve body.
Figure 4 is a vertical sectional view of another modified form of the three way valve having separate operators for the valve plugs.

In Figure 3 is illustrated another modified form of the three way valve wherein the lower valve plug 90 is held on the reduced lower end of a stem 91 by means of a nut 92 threaded thereon and clamping the valve plug against an annular shoulder 93 at the upper end of the reduced portion of the stem. An O-ring 94 disposed in an annular groove of the stem 91 seals between the stem and the valve plug.

The stem 91 extends upwardly through a cylindrical stem 95 and is provided with O-rings 96 which seal between the stems. The stem 91 is provided with an enlargement 98 intermediate its ends, and a bearing ring 99 is supported on the upper end of the enlargement. This bearing ring 99 and a spring 100 are disposed in a housing 101 whose lower end is secured to the upper end of the cylindrical stem 95 by means of a pair of split snap lock rings 102. The opposite ends of the compression spring 100 bear against the bearing ring 99 and a cap 103 closing the upper end of the housing so that the spring exerts a force pushing the lower valve plug 90 downwardly against its valve seat 18 and simultaneously pushing an upper valve plug 104 on the lower end of the cylindrical stem upwardly against its valve seat 20. In this modified form of the valve, the biasing spring 100 which tends to hold the valve closed is positioned exteriorly of the valve body 10, where it may be changed or adjusted readily without tearing down the entire valve.

The upper valve plug 104 is held on the reduced lower end of the cylindrical stem 95 between a snap lock ring 105 and a downwardly facing shoulder 106 at the upper end of the reduced lower end of the cylindrical stem. The cylindrical stem extends upwardly through a valve bonnet 108 threaded into the circular aperture 15 at the upper end of the valve body 10, and O-rings 109 mounted in external grooves in the stem seal between said cylindrical stem and the valve bonnet.

A lock nut 112 may be threaded on the cylindrical stem below the housing 101 to lock the cylindrical stem 95 against downward movement, if be desired, thus preventing the downward opening movement of the upper valve plug and providing a positive shut-off of flow of fluid out the outlet 32. The lock nut 112, of course, may be rotated to a position where it permits normal upward and downward movement of the cylindrical stem.

The inner stem 91 extends upwardly through the housing and cap 103 and through an aperture in the bottom of a rectangular cage 114 into the interior thereof. The cage is open on two sides and a nut 115 threaded on the upper end of the stem 91 is engageable by the bottom of the cage 114 to move the stem upwardly when the cage is itself moved upwardly by an operator 116 to whose lower end the cage is threaded.

The operator may be controlled by any suitable means such as the double diaphragm 120 disposed in the housing 121 having an upper inlet 122 and a lower inlet 123. The housing may be mounted on the upwardly extending arms 124 of the valve bonnet 108.

It will be apparent that if the lock nut 112 is rotated from the locked position shown in Figure 3 to an unlocked position freeing the cylindrical stem 95 for vertical movement, fluid pressure introduced into the upper part of the housing 121 will act on the diaphragm to cause the operator 116 to move downwardly. As a result the bottom of the cage 114 engages the top of the spring housing and causes the cylindrical stem to move downwardly unseating the upper valve plug 104 and permitting flow of fluid from the inlet 11 to the outlet 32. If fluid pressure is admitted to the lower part of the housing 121 through the inlet 123, the operator is moved upwardly causing the stem 91 to move upwardly, thus unseating the lower valve plug 90 and permitting flow of fluid from the inlet 11 to the outlet 30. Also, if desired, a suitable wedge or cam lock may be mounted on the arms 124 to engage the upper end of the stem 91 to positively lock the stem against upward movement and to provide a positive shut-off of the lower valve plug by holding the same engaged with the seat 18.

In Figure 4 is illustrated still another modified form of the three way valve, wherein the lower valve plug 130 is held against downward displacement from the stem 133 by a nut 132 threaded on the lower end thereof. The upper valve plug 134 is slidable on the stem 133 above the lower valve plug, and a spring 135 disposed about the stem 133 and confined between the upper and lower valve plugs yieldingly urges the valve plugs away from each other and into closed or seating engagement plugs away from each other and into closed or seating engagement with their respective valve seats 20 and 18. A cylindrical sleeve or shield 137 slidably surrounds the reduced inwardly facing portions 138 of the valve plugs and the spring. O-rings 139 disposed in annular grooves in the reduced portions of the valve plugs seal between the valve plugs and the shield 137 so that the fluid flowing through the valve cannot corrode or erode the spring or the surfaces of the stem 133 and the valve plugs between which relative movement occurs. This structure also limits the pressure applied to the valve plugs by the fluid flowing through the valve body, and which opposes opening movement of the valve plugs, so that a smaller force is needed to open the valve plugs.

O-rings 140 disposed in annular recesses in the stem 133 seal between the valve plugs and the stem, and the stem extends through a cylindrical stem 142 and a lower diaphragm housing 143 into a separate upper diaphragm housing 145 wherein its upper end is connected to a diaphragm 146 which is adapted to move the stem 133 upwardly or downwardly depending on which side of the diaphragm a greater fluid pressure is introduced. The upper and lower diaphragm housings are sealed from each other by suitable means such as O-rings about the stem 133.

The diaphragm 148 in the lower housing 143 is connected to the upper end of the cylindrical stem being moved upwardly or downwardly depending on which side of the diaphragm a greater fluid pressure is introduced. O-rings 151 disposed in annular grooves of the cylindrical stem seal between the same and the valve bonnet, while O-ring 152 disposed in annular grooves in the inner stem 133 seal between said inner stem and the cylindrical stem.

The housings 143 and 145 may be secured in sealing engagement with upper end of the valve bonnet by means of set screws 153 as shown.

It will now be apparent that when the diaphragm 146 moves the inner stem 133 upwardly, the lower valve plug will be lifted off its seat and fluid will flow from the inlet 11 to the outlet 30. Likewise, when the diaphragm 148 moves the cylindrical stem 142 downwardly, the upper valve plug will be moved downwardly away from its seat and fluid will flow from the inlet 11 to the outlet 32.

It will be obvious that both valve plugs may be simultaneously moved to open position so that fluid will flow simultaneously through both outlets of the valve body. It will also be apparent that the degree of displacement of each valve plug can be individually controlled by its associated diaphragm so that the rate of flow of fluid out of each outlet may be different from the rate of flow out the other outlet.

It will also be apparent that either valve plug may be held in open position while the other is held in closed position.

Figures 5, 6:
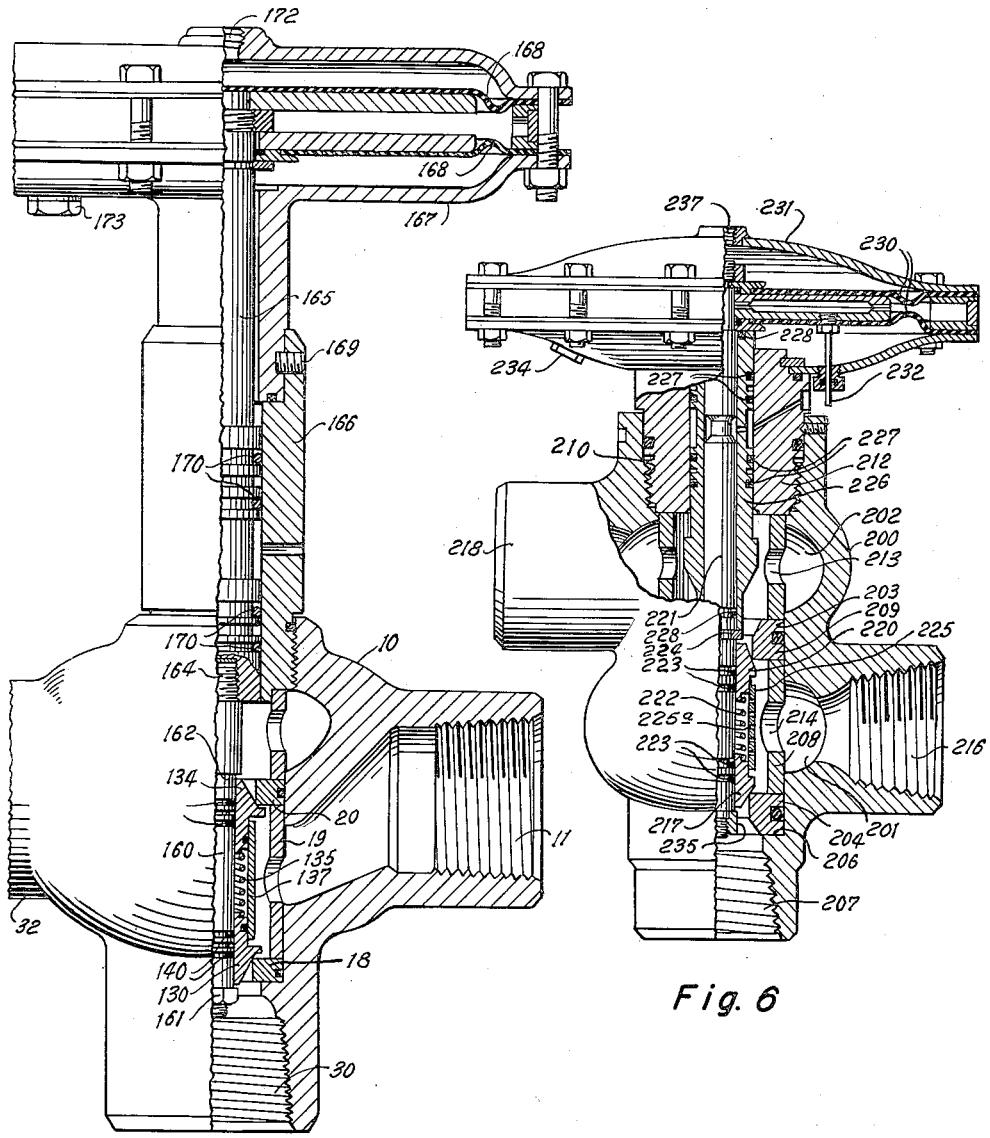
Figure 5 is a view partly in elevation and partly in section of another modified form of the three way valve.
Figure 6 is a similar view of still another modified form of the three way valve.

A further modified three way valve is illustrated in Figure 5, said valve having lower and upper valve plugs 130 and 134, identical to those of the valve illustrated in Figure 4, biased apart toward closed positions by a spring 135 and having a shield 137. The valve plugs are slidably disposed on a stem 160 having a nut 161 threaded on the lower end thereof to limit downward movement of the valve plugs relative to the stem and a downwardly facing annular shoulder 162 spaced above the nut to limit upward movement of the valve plugs relative to the stem. The stem has its reduced upper end 164 threaded into the bore in the lower end of an operator 165 which extends upwardly through the valve bonnet 166 into a diaphragm housing 167 where its upper end is connected to a double diaphragm 168. The diaphragm housing is secured in sealing relation to the upper end of the valve bonnet by means of set screws 169. The operator 165 is provided with external annular grooves in which are disposed O-rings 170 for sealing between the operator and the valve bonnet.

It will now be apparent that when a fluid pressure is introduced into the upper portion of the diaphragm housing 167 through the inlet 172 the operator 165 and the stem 160 are moved downwardly, causing the stem 160 to slide downwardly through the valve plugs 130 and 134 until the stop shoulder 162 engages the upper valve plug. Further downward movement of the operator and stem will then move the upper valve plug 134 downwardly out of engagement with its valve seat 20 and permit fluid to flow from the inlet 11 to the outlet 32. If fluid pressure is introduced into the lower portion of the diaphragm housing 167 through the inlet 173 the operator 165 and the stem 160 are moved upwardly, causing the stem 160 to slide upwardly through the valve plugs until the nut 161 engages the lower valve plug. Further upward movement of the operator and stem will then move the lower valve plug upwardly out of engagement with its valve seat 18 and permit fluid to flow from the inlet 11 to the outlet 30.

The valve plugs shown in the forms of the invention illustrated in Figures 3, 4 and 5 are each provided with a laterally projecting flange upstream of their beveled seat portions, and these flanges provide impingement surfaces upon which flowing fluids may act to aid in moving the valve plugs to closed positions. Under certain flow conditions these impingement flanges may serve as a safety means for automatically closing the valves when excess velocities of flow occur or in case of failure of the operating mechanism to function. Of course, the flanges may be omitted if desired.

In Figure 6 still another modification of the three way valve is shown having a valve body 200 formed with a lower compartment 201 and an upper compartment 202 connected by a circular aperture or passageway 203. A lower valve seat 204 is disposed below the compartment 201 on an annular shoulder 206 surrounding the outlet 207 from the body. A spacer sleeve 208 is supported on the valve seat 204 and extends upwardly through the lower compartment into the circular aperture 203, where it supports an upper valve seat 209 in said aperture. An upper spacer sleeve is supported on the upper valve seat 209 and extends upwardly through the upper compartment into a service opening or aperture 210 into which is threaded a valve bonnet 212 whose lower end engages the upper end of the upper spacer sleeve to hold the valve seats and spacer sleeves in position in the valve body.

The upper and lower spacer sleeves are provided with lateral apertures 213 and 214, respectively, so that fluid may flow from the inlet 216 of the valve body through the compartment 201, the lateral apertures 214 and through the lower valve seat to the outlet 207 when the valve plug 217 is in raised open position. Conversely, when the upper valve plug is in lowered open position, fluid may flow from the inlet 216 to the compartment 201, through the lateral apertures 214, the interior of the lower spacer sleeve, the lateral apertures 213 and the compartment 202 to the outlet 218 from the valve body.

The valve plugs 217 and 220 are slidably mounted on an inner stem 221 and are biased apart and toward their respective valve seats by a spring 222. A shield or sleeve 225 surrounds the spring and slidably engages the reduced inner portions of the valve plugs as in the valve shown in Figure 4.

The inner stem 221 is provided with O-rings 223 which seal between the stem and the valve plugs and a snap lock ring 224 which is disposed in an annular groove in the stem. A cylindrical stem 226 is mounted on the inner stem 221 above the snap lock ring 224 and extends upwardly through the valve bonnet 212. O-rings 227 seal between the cylindrical stem and the valve bonnet while O-rings 228 seal between the inner stem 221 and the cylindrical stem 226.

The upper end of the inner stem 221 is connected to a double diaphragm 230 in a diaphragm housing 231 which is mounted in a suitable manner on the valve bonnet.

The diaphragm may be provided with a plunger 232 which extends exteriorly of the housing to indicate the position of the diaphragm.

It will be apparent that when fluid pressure is introduced into the lower portion of the diaphragm housing 231 through the inlet 234, the diaphragm 230 will raise the inner stem 221 until the nut 235 threaded on the lower end of the stem engages the lower valve plug. Further upward movement of the stem will then raise the lower valve plug 217 and allow fluid to flow from the inlet 216 to the outlet 207. If fluid pressure is introduced into the upper portion of the diaphragm housing through the inlet 237, the cylindrical stem is moved downwardly on the inner stem 221 until it engages the snap lock ring 224 which then engages the upper valve plug 220 and moves it downwardly to open position so that fluid may flow from the inlet 216 to the outlet 218. During the downward movement of the cylindrical stem 212, the inner stem 221 is also moved down but it does not carry the load of opening the upper valve plug.

The shield 225 may be provided with lateral apertures 225a as shown, so that the pressure of the fluid from the inlet 216 may be exerted over a greater effective area of the valve bodies to tend to hold them closed, in co-operation with the spring 222, against any back pressure which might develop.

In all forms of the invention, other operating mechanisms than the diaphragm pressure means illustrated and described may be used for actuating the valve members.

It will now be apparent that several modified forms of a new and improved three way valve have been illustrated and described, and that each form of the three way valve includes a valve body having an inlet and two outlets, a pair of valve plugs each selectively controlling flow of fluid from the inlet to its associated outlet, biasing means simultaneously urging both valve plugs toward closed positions, and a control means for selectively and individually moving the plugs toward open positions. It will also be apparent that in each of the forms of the three way valve illustrated and described the pressure of the fluid entering into the inlet urges the valve plugs toward closed positions. In some installations where it is desired that a very small force from the operator be sufficient to move the valve plugs toward open position, the bellows of Figures 1 and 2, or the shields of Figures 3, 4 and 5, between the valve plugs are made to have such large diameters that only a very small portion of the upstream area of the valve plugs is exposed to the fluid pressure of the inflowing fluid which tends to hold the valve plugs in closed positions. On the other hand, where it is desired that a relatively large force be exerted by the operator to move the valve plugs toward open position, the bellows of Figures 1 and 2 of the shields of Figures 3, 4 and 5 are made to be of such small diameters that relatively large areas of the valve plugs are exposed to the fluid pressure which tends to hold the valve plugs in closed position. Or, alternatively, the shield may be provided with perforations, as in Figure 6, to permit the fluid pressure to enter within the shield thus exposing larger areas of the valve plugs to this fluid pressure.

The foregoing description of the invention is explanatory only and changes in the details of the construction illustrated may be made by those skilled in the art, within the scope of the appended claims, without departing from the spirit of the invention.

What I claim and desire to secure by Letters Patent is:

1. A three way valve including: a valve body having an inlet and two outlets; a pair of valve plugs, one valve plug controlling flow of fluid from the inlet to one of said outlets, and the other valve plug controlling flow of fluid from the inlet to the other of said outlets; means biasing said valve plugs in opposite directions and normally holding said valve plugs in closed position whereby flow of fluids from the inlet to said outlets is prevented; and means for selectively moving each of said valve plugs to its open position whereby fluid may flow from the inlet to a selected outlet; said biasing means comprising an imperforate bellows sealingly connected to and disposed between said valve plugs, said bellows reducing the area of the valve plugs exposed to the pressure of the fluid from the inlet which tends to hold the plugs in closed positions whereby the force necessary to move the valve plugs to open positions may be reduced to a desired value.

2. A three way valve including: a valve body having an inlet and two outlets; a pair of valve plugs, one valve plug controlling flow of fluid from the inlet to one of said outlets, and the other valve plug controlling flow of fluid from the inlet to the other of said outlets; means biasing said valve plugs in opposite directions and normally holding said valve plugs in closed position whereby flow of fluid from the inlet to said outlets is prevented; means for individually and selectively moving each of said valve plugs to its open position whereby fluid may flow from the inlet to a selected outlet; said biasing means comprising a resilient means disposed between said valve plugs; and means disposed between said valve plugs and connecting said valve plugs for shielding substantial areas of the valve plugs from the pressure of the fluid from the inlet which tends to hold the plugs in closed positions whereby the force necessary to move the valve plugs to open positions may be reduced to a desired value.

3. A three way valve comprising: a valve body having a pair of compartments, an inlet and a first outlet communicating with the first of said compartments, a second outlet communicating with the second of said compartments, and an aperture providing communication between said first and second compartments; a first valve plug for closing said first compartment from said first outlet; a second valve plug for closing said aperture; means biasing said valve plugs in opposite directions toward normally closed positions; means for individually and selectively moving each of said valve plugs against the force of said biasing means toward an open position whereby fluid may flow from the inlet to a selected outlet, said valve plugs being positioned in said first compartment whereby said plugs are exposed to the pressure of the fluid in the inlet which tends to hold said valve plugs in closed positions; and shield means extending between said valve plugs substantially reducing the areas of the plugs exposed to the pressure of the fluid from the inlet.

4. A three way valve comprising: a valve body having a pair of compartments, an inlet and a first outlet communicating with the first of said compartments, a second outlet communicating with the second of said compartments, and an aperture providing communication between said first and second compartments; a first valve plug for closing said first compartment from said first outlet; a second valve plug for closing said aperture; means biasing said valve plugs in opposite directions toward normally closed positions; said valve body having an opening communicating with said second compartment; a first stem extending from without the valve body through said opening, said second compartment and said aperture into said first compartment, said first valve plug being connected to said stem, said second valve plug being slidably disposed on said stem; shielding means extending between said first and second valve plugs and about said stem, each of said valve plugs being movable relative to said shielding means; and a cylindrical stem slidably disposed on said first stem for moving said second valve on said first stem, movement of said first stem in one direction moving said first plug toward open position and movement of said cylindrical stem in the opposite direction moving said second valve plug toward open position.

5. A three way valve comprising: a valve body having a pair of compartments, an inlet and a first outlet communicating with the first of said compartments, a second outlet communicating with the second of said compartments, and an aperture providing communication between said first and second compartments; a first valve plug for closing said first compartment from said first outlet; a second valve plug for closing said aperture; means biasing said valve plugs in opposite directions toward normally closed positions; shielding means extending between said valve plugs and about said biasing means; said valve body having an opening communicating with said second compartment; a first stem extending from without the valve body through said opening, said second compartment and said aperture into said first compartment, said first valve plug being connected to said stem, said second valve plug being slidably disposed on said stem; and a cylindrical stem slidably disposed on said first stem for moving said second valve on said first stem, movement of said first stem in one direction moving said first plug toward open position and movement of said cylindrical stem in the opposite direction moving said second valve plug toward open position, each of said valve plugs being movable relative to said shielding means, said valve plugs being positioned in said first compartment whereby said plugs are exposed to the pressure of the fluid in the inlet which tends to hold said valve plugs in closed position.

6. A three way valve comprising: a valve body having a pair of compartments, an inlet and a first outlet communicating with the first of said compartments, a second outlet communicating with the second of said compartments, an aperture providing communication between said first and second compartments; a first valve plug for closing said first compartment from said first outlet; a second valve plug for closing said aperture; means biasing said valve plugs in opposite directions toward normally closed positions; shielding means extending between said valve plugs and about said biasing means; said body having an opening communicating with said second compartment; a first stem extending from without the valve body through said opening, said second compartment and said aperture into said first compartment, said first valve plug being connected to said stem, said second valve plug being slidably disposed on said stem; and a cylindrical stem slidably disposed on said first stem for moving said second valve on said first stem, movement of said cylindrical stem in one direction moving said first plug toward open position and movement of said cylindrical stem in the opposite direction moving said second valve plug toward open position, each of said valve plugs being movable relative to said shielding means, said valve plugs being positioned in said first compartment whereby said plugs are exposed to the pressure of the fluid in the inlet which tends to hold said valve plugs in closed position, said cylindrical stem being rigidly connected to second valve plug.

7. A three way valve comprising: a valve body having a pair of compartments, an inlet and a first outlet communicating with the first of said compartments, a second outlet communicating with the second of said compartments, an aperture providing communication between said first and second compartments; a first valve plug for closing said first compartment from said first outlet; a second valve plug for closing said aperture; means biasing said valve plugs in opposite directions toward normally closed positions; shielding means extending between said valve plugs and about said biasing means; said valve body having an opening communicating with said second compartment; a first stem extending from without the valve body through said opening, said second compartment and said aperture into said first compartment, said first valve plug being connected to said stem, said second valve plug being slidably disposed about said stem; and a cylindrical stem slidably disposed about said first stem for moving said second valve on said first stem, movement of said first stem in one direction moving said first plug toward open position and movement of said cylindrical stem in the opposite direction moving said second valve plug toward open position, each of said valve plugs being movable relative to said shielding means, said valve plugs being positioned in said first compartment whereby said plugs are exposed to the pressure of the fluid in the inlet which tends to hold said valve plugs in closed position, said biasing means comprising a resilient means disposed about said first stem and between said valve plugs.

8. A three way valve comprising: a valve body having a pair of compartments, an inlet and a first outlet communicating with the first of said compartments, a second outlet communicating with the second of said compartments, and an aperture providing communication between said first and second compartments; a first valve plug for closing said first compartment from said first outlet; a second valve plug for closing said aperture; means biasing said valve plugs in opposite directions toward normally closed positions; said valve body having an opening communicating with said second compartment; a first stem extending from without the valve body through said opening, said second compartment and said aperture into said first compartment, said first valve plug being connected to said stem, said second valve plug slidably disposed about said stem; a cylindrical stem slidably disposed about said first stem for moving said second valve on said first stem, movement of said first stem in one direction moving said first plug toward open position and movement of said cylindrical stem in the opposite direction moving said second valve plug toward open position, said valve plugs being positioned in said first compartment whereby said plugs are exposed to the pressure of the fluid in the inlet which tends to hold said valve plugs in closed position; said biasing means comprising a resilient means disposed about said first stem and between said valve plugs; and a shield extending about said biasing means and said valve plugs and sealingly engaging said valve plugs for reducing the areas of the plugs exposed to the pressure of the fluid from the inlet.

9. A three way valve comprising: a valve body having a pair of compartments, an inlet and a first outlet communicating with the first of said compartments, a second outlet communicating with the second of said compartments, and an aperture providing communication between said first and second compartments; a first valve plug for closing said first compartment from said first outlet, a second valve plug for closing said aperture; means biasing said valve plugs in opposite directions toward normally closed positions; shielding means extending between said valve plugs and about said biasing means; said valve body having an opening communicating with said second compartment; a first stem extending from without the valve body through said opening, said second compartment and said aperture into said first compartment, said first valve plug being connected to said stem, said second valve plug being slidably disposed about said stem; a cylindrical stem slidably disposed about said first stem for moving said second valve on stem, movement of said first stem in one direction moving said first plug toward open position and movement of said cylindrical stem in the opposite direction moving said second valve plug toward open position, each of said valve plugs being movable relative to said shielding means, said valve plugs being positioned in said first compartment whereby said plugs are exposed to the pressure of the fluid in the inlet which tends to hold said valve plugs in closed position; an operator connected to said first stem for moving said first stem in one direction to move said first plug to open position, said operator engaging said cylindrical stem to move said cylindrical stem in the opposite direction to move said second plug to open position.

10. A three way valve comprising: a valve body having a pair of compartments, an inlet and a first outlet communicating with the first of said compartments, a second outlet communicating with the second of said compartments, and an aperture providing communicating between said first and second compartments; a first valve plug for closing said first compartment from said first outlet; a second valve plug for closing said aperture; means biasing said valve plugs in opposite directions toward normally closed positions; shielding means extending between said valve plugs and about said biasing means; said valve body having an opening communicating with said second compartment; a first stem extending from without the valve body through said opening, said second compartment and said aperture into said first compartment, said first valve plug being connected to said stem, said second valve plug being slidably disposed about said stem; a cylindrical stem slidably disposed about said first stem for moving said second valve on said first stem, movement of said first stem in one direction moving said first plug toward open position and movement of said cylindrical stem in the opposite direction moving said second valve plug toward open position, each of said valve plugs being movable relative to said shielding means, said valve plugs being positioned in said first compartment whereby said plugs are exposed to the pressure of the fluid in the inlet which tends to hold said valve plugs in closed position, said biasing means being disposed about first stem exteriorly of said valve body.

11. A three way valve comprising: a valve body having a pair of compartments, an inlet and a first outlet communicating with the first of said compartments, a second outlet communicating with the second of said compartments, and an aperture providing communication between said first and second compartments, a first valve plug for closing said first compartment from said first outlet; a second valve plug for closing said aperture; means biasing said valve plugs in opposite directions toward normally closed positions; shielding means extending between said valve plugs and about said biasing means; said valve body having an opening communicating with said second compartment; a first stem extending from without the valve body through said opening, said second compartment and said aperture into said first compartment, said first valve plug being connected to said stem, said second valve plug being slidably disposed about said stem; a cylindrical stem slidably disposed about said first stem for moving said second valve on said first stem, movement of said first stem in one direction moving said first plug toward open position and movement of said cylindrical stem in the opposite direction moving said second valve plug toward open position, each of said valve plugs being movable relative to said shielding means, said valve plugs being positioned in said first compartment whereby said plugs are exposed to the pressure of the fluid in the inlet which tends to hold said valve plugs in closed position; said first stem and said cylindrical stem being connected to individual operating means whereby both plugs may be simultaneously opened by said operating means.

12. A three way valve comprising: a valve body having a pair of compartments, an inlet and a first outlet communicating with the first of said compartments, a second outlet communicating with the second of said compartments, and an aperture providing communication between said first and second compartments; a first valve plug for closing said first compartment from said first outlet; a second valve plug for closing said aperture; means biasing said valve plugs in opposite directions toward normally closed positions; said valve body having an opening communicating with said second compartment; a first stem extending from without the valve body through said opening, said second compartment and said aperture into said first compartment, said first valve plug being connected to said stem, said second valve plug being slidably disposed about said stem; a cylindrical stem slidably disposed about said first stem for moving said second valve on said first stem, movement of said first stem in one direction opening said first plug toward open position and movement of said cylindrical stem in the opposite direction moving said second valve plug toward open postion, said valve plugs being positioned in said first compartment whereby said plugs are exposed to the pressure of the fluid in the inlet which tends to hold said valve plugs in closed position; said biasing means comprising a resilient means disposed about said first stem and between said valve plugs; and a shield extending about said biasing means and said valve plugs, each of said valve plugs being movable relative to said shield, said shield being provided with lateral perforations whereby the pressure of the fluid from the inlet is utilized to aid in holding said valve plugs in closed position.

13. A three way valve including: a valve body having an inlet and two outlets communicating with each other; a pair of valve plugs movable in the body, one valve plug controlling flow of fluid from the inlet to one of said outlets and the other valve plug controlling flow of fluid from the inlet to the other of said outlets; valve stem means extending from exteriorly of the body into said body and operatively connected with said plugs for selectively moving each of said valve plugs to its open position, whereby fluid may flow from the inlet to the selected outlet; biasing means surrounding said stem means between said valve plugs and engaging said valve plugs to bias said plugs in opposite directions and normally holding said valve plugs in said closed position, whereby flow of fluids from the inlet to said outlets is prevented, said valve stem means having a pair of opposed shoulders engageable with opposed shoulders on each of said valve plugs for moving said valve plugs to open position, the distance between said opposed shoulders on said valve stem means being greater than the distance between the opposed shoulders of the valve plugs when said plugs are in closed position; and a shielding sleeve extending between and sealingly engaging said valve plugs for closing off substantial areas of said valve plugs from the pressure of the fluid in the valve body between said plugs, said valve plugs having portions telescoping into opposite ends of said shielding sleeve and extending inwardly toward each other from said opposed shoulders of the valve plugs.

14. A three way valve of the character set forth in claim 13 wherein said shielding sleeve is disposed about said biasing means whereby said biasing means is protected from contact with the fluid flowing through said valve.

15. A three way valve including: a valve body having an inlet and two outlets; a pair of valve plugs, one valve plug controlling flow of fluid from the inlet to one of said outlets, and the other valve plug controlling flow of fluid from the inlet to the other of said outlets; means biasing said valve plugs in opposite directions and normally holding said valve plugs in closed position whereby flow of fluid from the inlet to said outlets is prevented; means for selectively moving each of said valve plugs to its open position whereby fluid may flow from the inlet to a selected outlet; and shielding means extending between and engaging said valve plugs, said valve plugs extending inwardly into opposite ends of said shielding means, each of said valve plugs being movable relative to said shielding means; said biasing means being disposed within said shielding means and acting on said valve plugs.

References Cited in the file of this patent

UNITED STATES PATENTS

| | | |
|---|---|---|
| 97,472 | Ashfield | Dec. 7, 1869 |
| 123,546 | Ashton | Feb. 13, 1872 |
| 1,036,451 | Casper | Aug. 20, 1912 |
| 1,884,458 | Willenborg | Oct. 25, 1932 |
| 2,189,221 | Paine et al. | Feb. 6, 1940 |
| 2,306,469 | Rupley | Dec. 29, 1942 |
| 2,314,860 | Lenin | Mar. 23, 1943 |
| 2,703,105 | Stoner | Mar. 1, 1955 |
| 2,703,666 | Lannelli | Mar. 8, 1955 |
| 2,714,394 | Moran | Aug. 2, 1955 |